UNITED STATES PATENT OFFICE 2,556,419

5-HALO-2-VINYLTHIOPHENES

William S. Emerson and Tracy M. Patrick, Jr., Dayton, Ohio, assignors to Monsanto Chemical Company, St. Louis, Mo., a corporation of Delaware No Drawing. Application May 1, 1947,
Serial No. 745,250

5 Claims. (Cl. 260—332.5)

The present invention relates to 5-halo-2-vinylthiophenes and to their preparation by dehydrochlorination of 2-(alpha chloroethyl) thiophenes.

Dibromides of vinyl substituted aromatic compounds are known to be of value for the destruction of insect pests and while 2-vinylthiophene forms a dibromide which is toxic to certain insects, the dibromide is distinctly unstable. An object of this invention is to provide new useful vinylthiophenes. A further object is to provide vinylthiophenes which form stable dibromides. A still further object of this invention is to provide a process for the preparation of vinylthiophenes. Other objects will be apparent from the detailed description following.

In accordance with this invention is has been discovered that in contrast to 2-vinylthiophenes the heretofore unknown halovinylthiophenes form stable dibromides. In addition, these nuclearly halogen substituted vinylthiophenes readily undergo polymerization to a variety of useful products. They may be polarized alone or in admixture with other polymerizable materials, forming plastics ranging from rubbery materials to hard resins. Valuable new compounds of this class possess the structure.

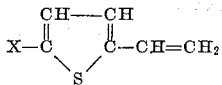

where X represents halogen. The invention is also concerned with halogen substituted vinylthiophenes containing halogen in the vinyl group. As would be expected, these compounds are much less reactive than the substituted vinylthiophenes having the halogen substituents solely in the nucleus.

Vinylthiophenes may be prepared by reduction of 2-acetothienone and then dehydration of the resulting carbinol, Mowry, et al., J. Am. Chem. Soc., 68, 1105 (1946); Nazzaro, et al., J. Am. Chem. Soc., 68, 2121 (1946). They may also be prepared by dehydrochlorinating the 2-(alpha-chloroethyl) compounds by treatment with suitable catalysts, as for example strong organic bases. However, the reaction tube plugged almost immediately when an attempt was made to pyrolyze a 2-(alphachloroethyl) thiophene over calcium sulfate. Treatment with alcoholic sodium hydroxide gave mostly 2-(alpha-ethoxy-ethyl) thiophene.

The following examples are specific embodiments of the invention and are to be taken as illustrative, not limitative thereof.

EXAMPLE I

5-chloro-2-vinylthiophene

Into a glass or glass-lined vessel of suitable capacity there was charged 355.5 parts by weight of 2-chlorothiophene, 132 parts by weight of paraldehyde and substantially 265 parts by weight of concentrated hydrochloric acid. This mixture was then saturated with hydrogen chloride by passing in a stream of hydrogen chloride gas. About thirty minutes was required for saturation during which time the reaction mixture was stirred and cooled. The gas was then introduced for another period of about 20 minutes at a maximum temperature of 9° C. The reaction mixture was then carefully diluted by pouring over ice. The organic layer was separated, washed several times with water and added with cooling to 237 parts by weight of pyridine containing 2.0 parts by weight of alpha-nitroso-beta-naphthol. The mixture was allowed to stand for about ninety minutes and then distilled up to 130° C./25 mm. The distillate was poured into a mixture of ice and concentrated hydrochloric acid, the layers separated and the organic portion washed with very dilute hydrochloric acid and then washed with very dilute ammonia. After drying over anhydrous calcium sulfate, the material was filtered and the product isolated by distillation. There was obtained 176 parts by weight of recovered 2-chlorothiophene, B. P. 49–52° C./50 mm.; 11.5 parts by weight of intermediate, B. P. 35–73° C./20 mm. and 103.5 parts by weight of 5-chloro-2-vinylthiophene, B. P. 73–78° C./20 mm., $N_D^{25}$ 1.5814. There was a residue of 55 parts by weight of clear amber resin. An analytical sample of 5-chloro-2-vinylthiophene boiled at 83.9–84.0° C./30 mm. $N_D^{25}$ 1.5820

$$d_4^{25} 1.206$$

Analysis gave 22.4% sulfur and 24.7% chlorine as compared to the calculated values for $C_2H_5ClS$ of 22.2% sulfur and 24.5% chlorine.

The dibromide of the above 5-chloro-2-vinylthiophene was prepared by adding over a ninety-minute period a solution of 48 parts by weight of bromine in substantially 79 parts by weight of carbon tetrachloride to a solution of 40 parts by weight of 5-chloro-2-vinylthiophene in substantially 475 parts by weight of carbon tetrachloride. The temperature was kept at −5° to −1° C. during the addition. The solvent was removed by evaporation leaving a residue of 82.7 parts by weight of 5-chloro-2-vinylthiophene dibromide, M. P. 76° C. This and all other melting points are corrected. An analytical sample after two crystallizations from hexane showed the same melting point. Analysis gave 22.8% carbon and 1.92% hydrogen as compared to calculated values for $C_6H_5Br_2ClS$ of 23.7% carbon and 1.66% hydrogen.

A dibromide from 2-vinylthiophene was prepared in similar manner but the white solid turned purple and decomposed on standing in air.

EXAMPLE II

5-bromo-2-vinylthiophene

Into a glass or glass-lined container of suitable capacity there was charged 326 parts by weight of 2-bromothiophene and substantially 176 parts by weight of concentrated hydrochloric acid. The mixture was then saturated with hydrogen chloride by passing in a stream of hydrogen chloride gas during which time 88 parts by weight of paraldehyde was gradually added. The reaction mixture was stirred and cooled during the addition of these reagents, about forty-five minutes being required. The reaction mixture was carefully diluted by pouring over ice and the organic layer separated. The organic layer was washed several times with ice water and then added with cooling to 158 parts by weight of pyridine containing 2.0 parts by weight of alpha-nitroso-beta-naphthol. The mixture was allowed to stand for about ninety minutes and then distilled up to 105° C./25 mm. The residue was washed with water and the organic layer separated and distilled to 100° C./15 mm. The distillates were then combined and, after the usual washing described in Example I, fractionation of the combined distillates yielded 96.9 parts by weight of recovered 2-bromothiophene, B. P. 57–73° C./30 mm.; 62.5 parts by weight of intermediate, B. P. 75–90° C./30 mm. and 58 parts by weight of 5-bromo-2-vinylthiophene, B. P. 90–103° C./30 mm. $N_D^{25}$ 1.6083. A further quantity of 5-bromo-2-vinylthiophene may be recovered from the intermediate fraction. Pure 5-bromo-2-vinylthiophene boiled at 85–87° C./16 mm., $N_D^{25}$ 1.6098, $$d_{25}^{25} 1.5259$$

Analysis gave 38.3% carbon and 2.99% hydrogen as compared to the calculated values for $C_6H_5BrS$ of 38.1% carbon and 2.67% hydrogen.

The dibromide was prepared by dissolving 2.0 parts by weight of 5-bromo-2-vinylthiophene in carbon tetrachloride and adding a slight excess of bromine in carbon tetrachloride. Evaporation of the solution left a quantitative yield of 5-bromo-2-vinylthiophene dibromide, M. P. 80–82° C. An analytical sample melted at 83° C. after two crystallizations from hexane. Analysis gave 21.2% carbon and 2.05% hydrogen as compared to values calculated for $C_6H_5Br_3S$ of 20.7% carbon and 1.44% hydrogen.

EXAMPLE III

Beta, 5-dichloro-2-vinylthiophene

In a glass or glass-lined reactor of suitable capacity fitted with a stirrer, thermometer, reflux condenser, dropping funnel and gas inlet tube, were placed 55 parts by weight of 2-vinylthiophene, 750 parts by weight of water, and a trace of a synthetic wetting agent. While this stirred mixture was held at 18–20° C. a solution of 82 parts by weight of approximately 70% calcium hypochlorite (a commercial product known as H. T. H. was used) in 750 parts by weight of water was added over a ten-hour period. Carbon dioxide was introduced during the addition. After a twelve-hour period of additional stirring, sodium bisulfite was added, and the mixture was filtered to remove calcium carbonate. A brown oil was separated from the filtrate. The precipitate was washed several times with benzene and each wash was used to extract the filtrate. The combined oil and washings were dried over anhydrous sodium sulfate. Distillation yielded 45 parts by weight of beta, 5-dichloro-2-vinylthiophene, B. P. 80° C./4–2 mm., $N_D^{25}$ 1.6150. An analytical sample boiled at 116–118° C./18 mm., $N_D^{25}$ 1.6169, $$d_{25}^{25} 1.3885$$

M. P. 16–18° C. Analysis gave 40.7% carbon, 2.55% hydrogen and 39.6% chlorine as compared to calculated values for $C_6H_4Cl_2S$ of 40.2% carbon, 2.25% hydrogen and 39.6% chlorine.

As will be apparent, many variations may be made from the specific embodiments set forth to describe the invention without departing from the spirit or scope of the present invention. The dehydrochlorination of the chloroethylated halothiophenes may be effected by other means than those specifically disclosed. While pyridine was the catalyst employed in the foregoing examples, any other organic tertiary nitrogen base may be used, as for example quinoline, quinaldine, dioctyl ethyl amine, alpha-, beta- or gamma-picolines, trimethyl amine, triethyl amine, tributyl amine, and triamyl amine. Still further examples of suitable organic base catalysts comprise dibenzyl amine, diethyl amine, di-2-ethyl hexyl amine, diamyl amine, and di-2-ethyl butyl amine. Other vinylthiophenes than those mentioned above may be prepared by dehydrochlorination of chloroethylated thiophenes including 2-vinylthiophene, 5-fluoro-2-vinylthiophene, and 5-iodo-2-vinylthiophene.

The dibromides of 2-vinylthiophenes are claimed in our co-pending application of even date.

The present invention is limited solely by the claims attached hereto as part of the present specification.

What is claimed is:

1. A compound of the structure

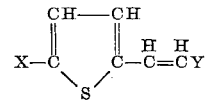

where X represents halogen and Y is a material of the group consisting of halogen and hydrogen.

2. A compound of the structure

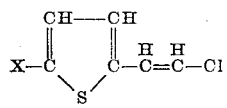

where X represents halogen.

3. A compound of the structure

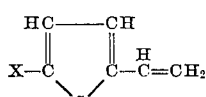

where X represents halogen.

4. 5-chloro-2-vinylthiophene.
5. 5-bromo-2-vinylthiophene.

WILLIAM S. EMERSON.
TRACY M. PATRICK, Jr.

(References on following page)

REFERENCES CITED

The following references are of record in the file of this patent:

UNITED STATES PATENTS

| Number | Name | Date |
|---|---|---|
| 2,492,663 | Schick | Dec. 27, 1949 |
| 2,512,596 | Arnold | June 27, 1950 |

OTHER REFERENCES

Gibson, Am. Chem. J., 12, 316–317 (1890).

Gilman and Wright, J. Am. Chem. Soc., 52, 3350–3351 (1931).

Weygand, Organic Preparations, pages 316, 319, Interscience Pub., N. Y., 1945.